March 12, 1935. O. G. SIMMONS 1,994,256
MACHINE FOR TESTING THE ACCURACY OF CURVED SURFACES
Filed Dec. 2, 1931 10 Sheets-Sheet 1
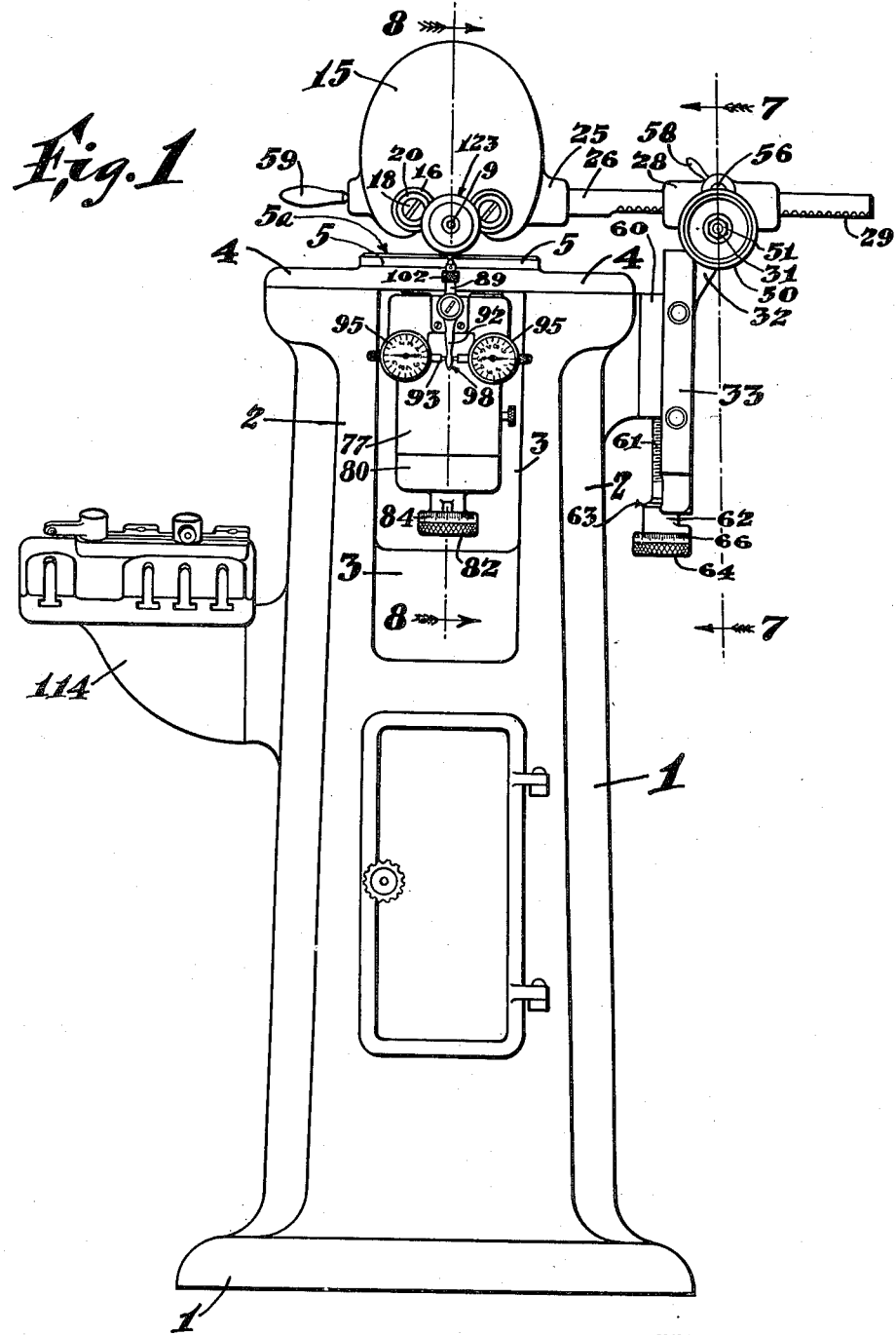
INVENTOR

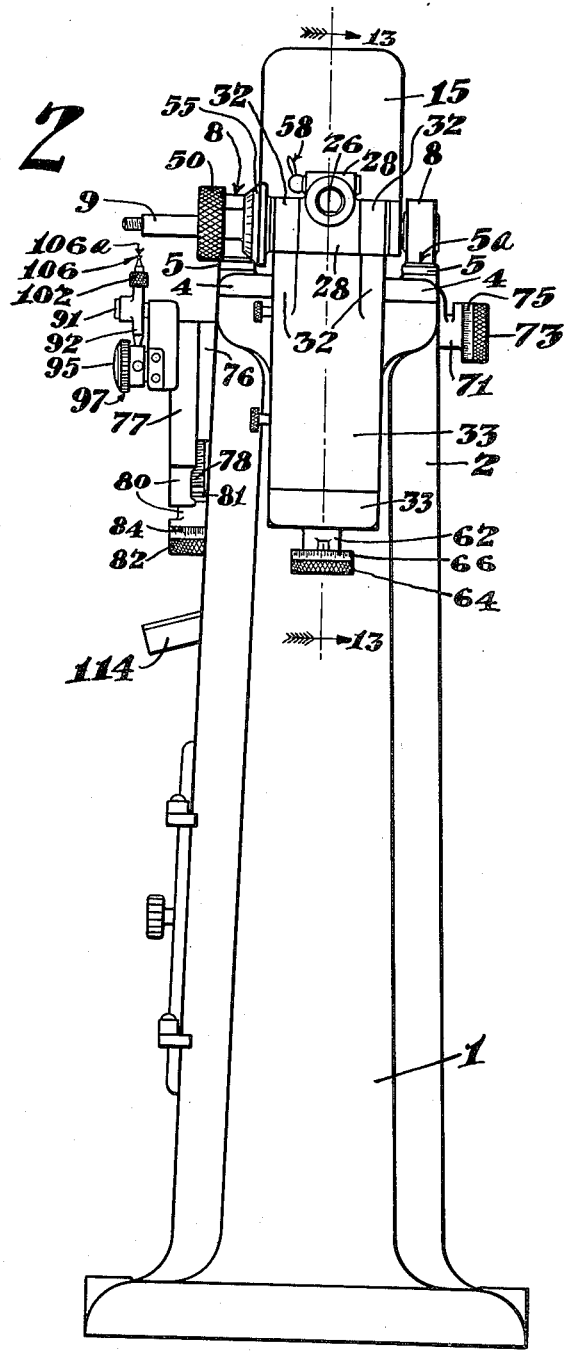

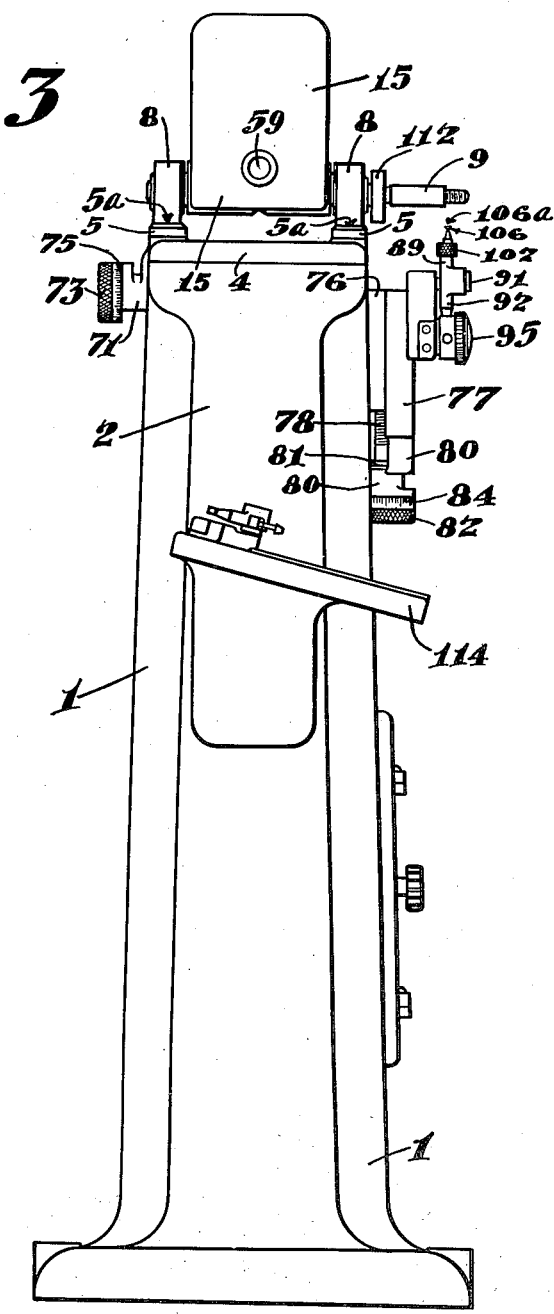

March 12, 1935.　　　O. G. SIMMONS　　　1,994,256
MACHINE FOR TESTING THE ACCURACY OF CURVED SURFACES
Filed Dec. 2, 1931　　10 Sheets-Sheet 4
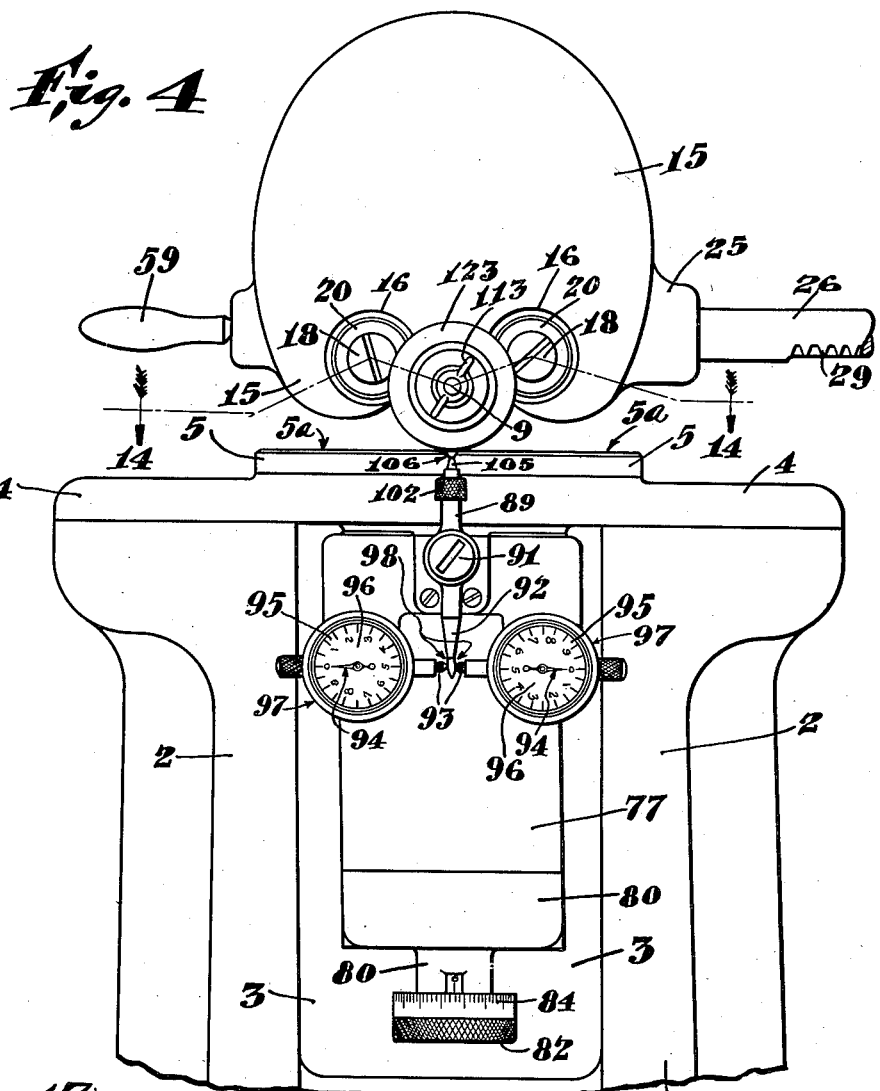
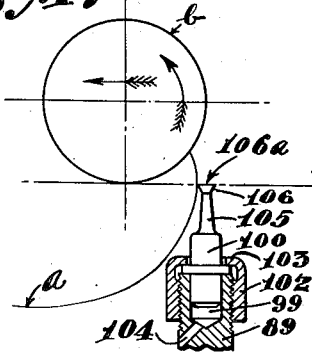
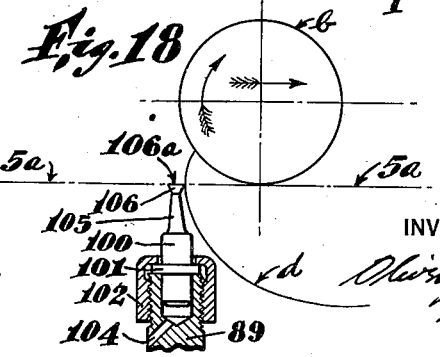
INVENTOR

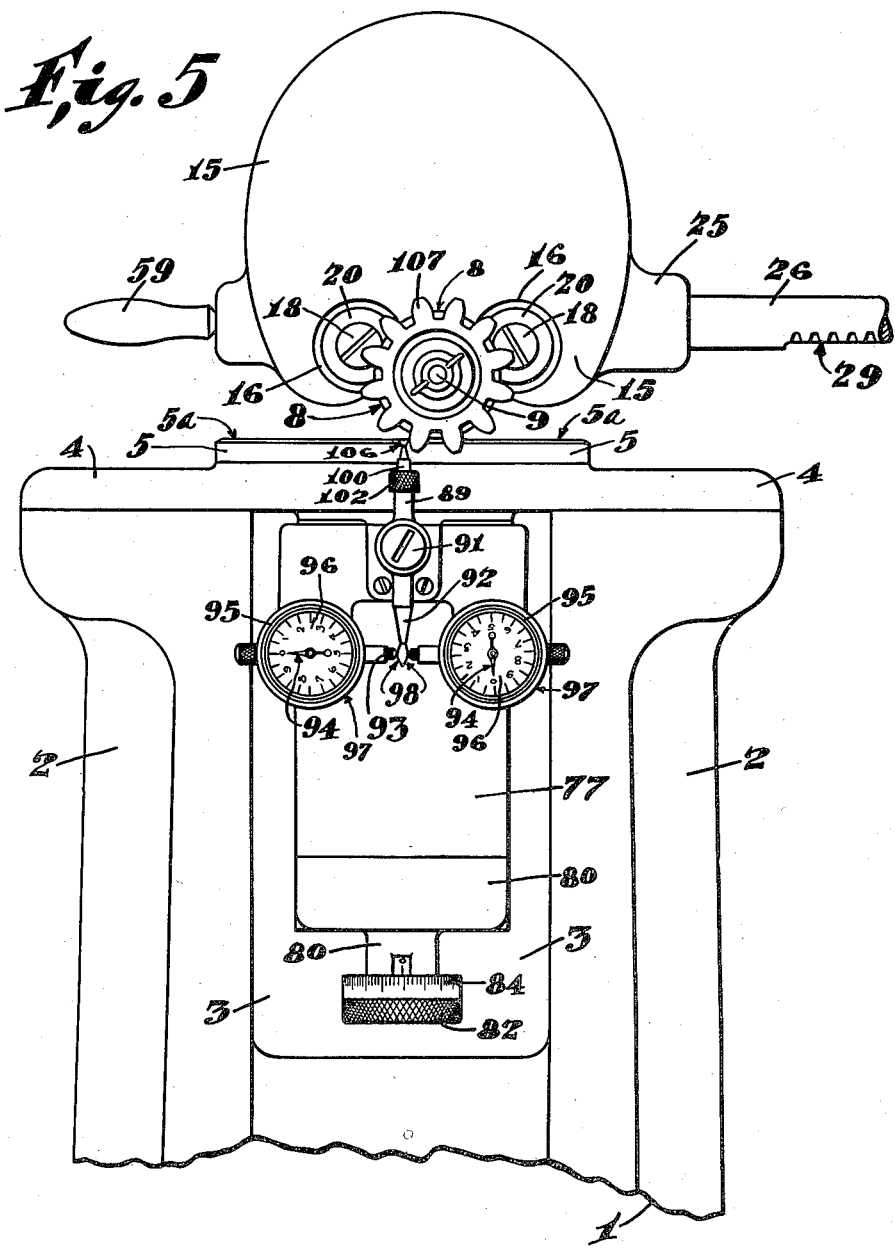

March 12, 1935. O. G. SIMMONS 1,994,256
MACHINE FOR TESTING THE ACCURACY OF CURVED SURFACES
Filed Dec. 2, 1931 10 Sheets-Sheet 6

INVENTOR
Oliver G. Simmons

March 12, 1935. O. G. SIMMONS 1,994,256

MACHINE FOR TESTING THE ACCURACY OF CURVED SURFACES

Filed Dec. 2, 1931 10 Sheets-Sheet 7

Fig. 7

INVENTOR

March 12, 1935.  O. G. SIMMONS  1,994,256
MACHINE FOR TESTING THE ACCURACY OF CURVED SURFACES
Filed Dec. 2, 1931   10 Sheets-Sheet 8
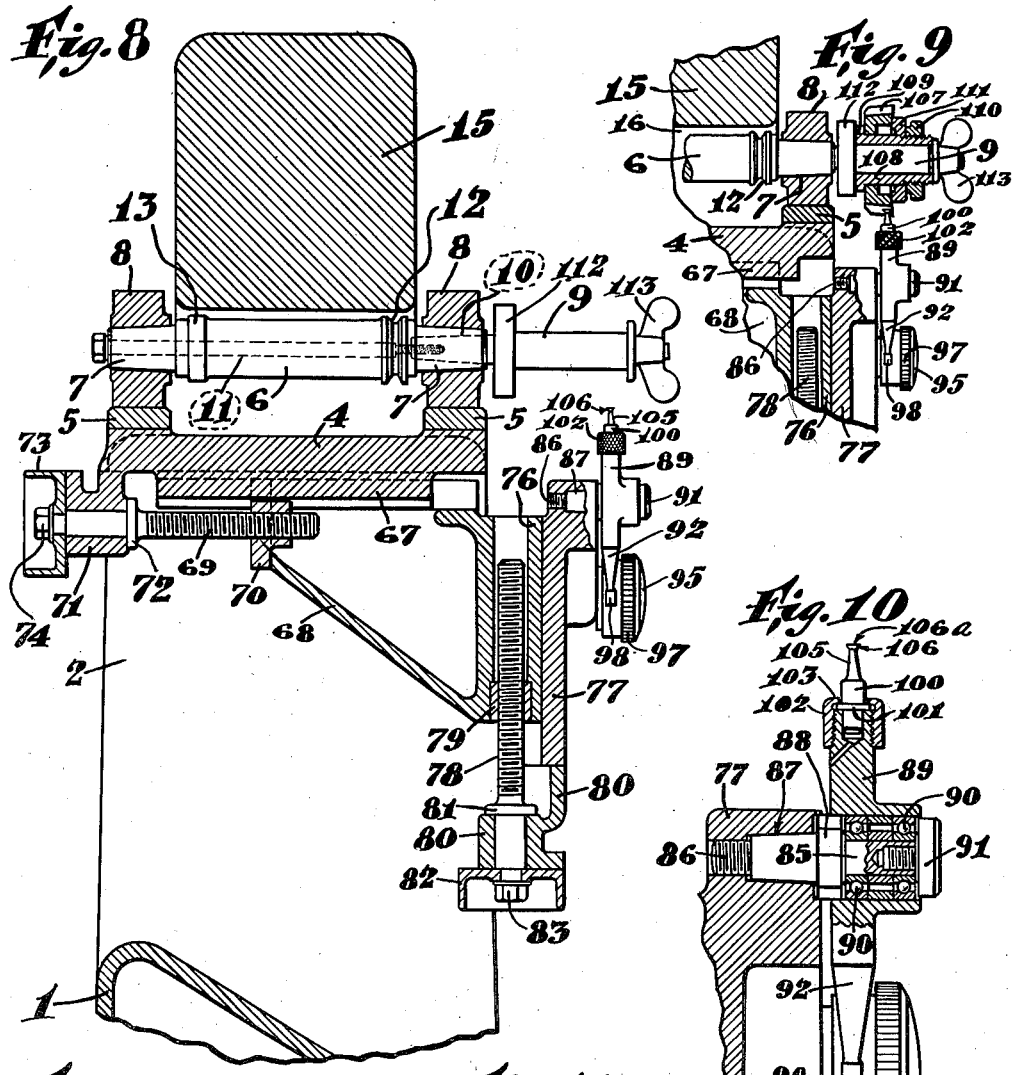
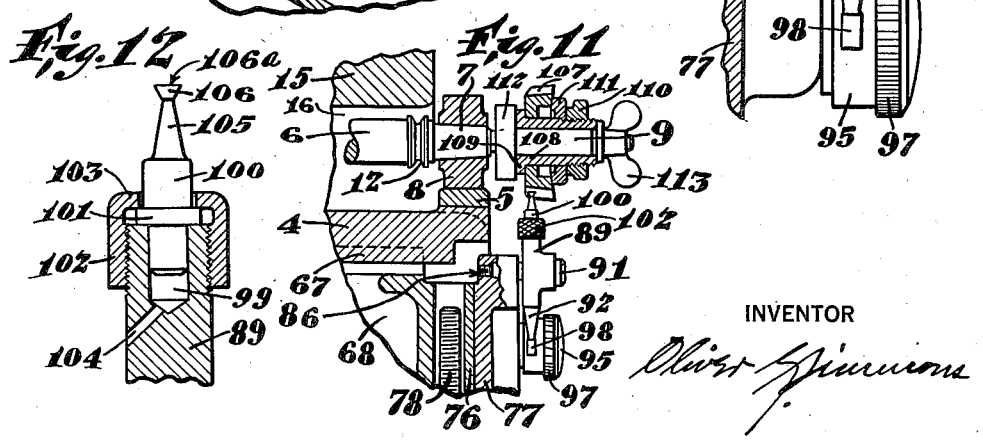
INVENTOR
Oliver Simmons

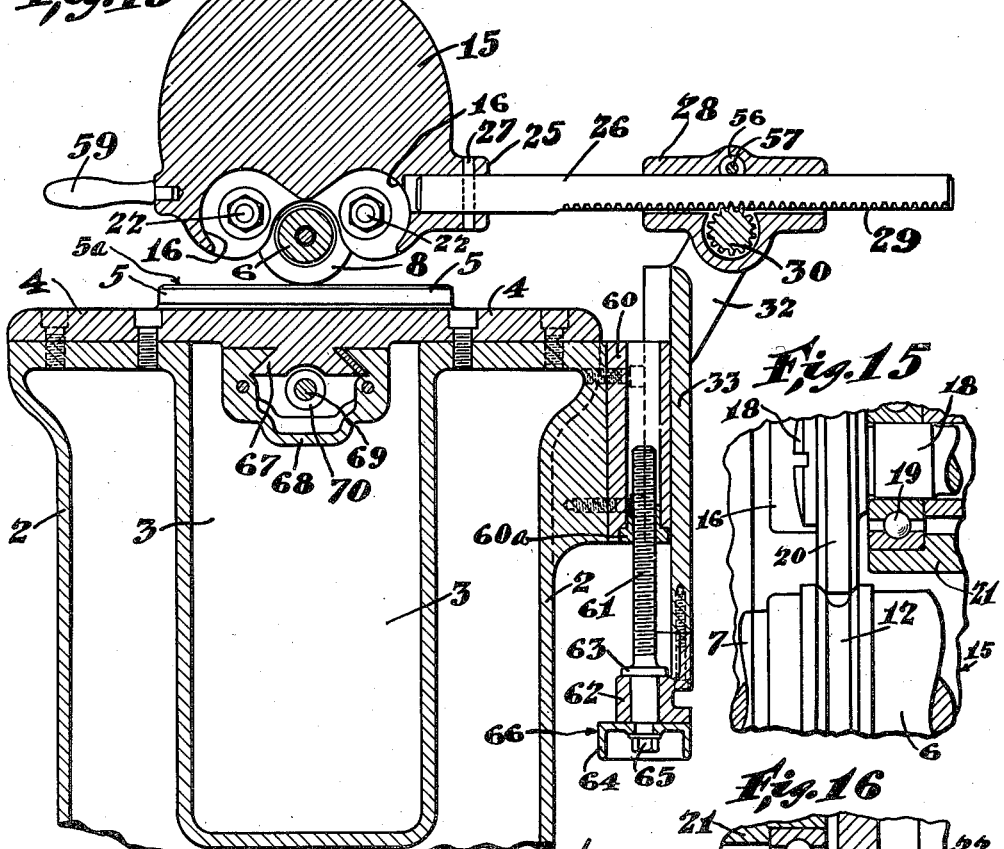

March 12, 1935. O. G. SIMMONS 1,994,256
MACHINE FOR TESTING THE ACCURACY OF CURVED SURFACES
Filed Dec. 2, 1931 10 Sheets-Sheet 10

INVENTOR
Oliver G. Simmons

Patented Mar. 12, 1935

1,994,256

UNITED STATES PATENT OFFICE 1,994,256

MACHINE FOR TESTING THE ACCURACY OF CURVED SURFACES

Oliver G. Simmons, Lakewood, Ohio, assignor, by mesne assignments, to Dual L. Simmons Application December 2, 1931, Serial No. 578,532

26 Claims. (Cl. 33—174)

My invention relates to improved method of and apparatus for testing surfaces intended to conform to curves which may be generated by a point on a straight or curved line or in the plane of such a line in rolling the straight line or curve upon a fixed curve, such curves being referred to generally as trochoidal curves and including cycloidal and involute curves suitable for the teeth of gears.

The device of the present invention is designed particularly for testing the accuracy of gear tooth profiles or other curved surfaces, being particularly designed for the testing of gears having tooth faces of involute form.

The present invention contemplates improvements in apparatus of the character disclosed in my Patent No. 1,670,906, dated May 22, 1928. In this patent it was shown that if a point is moved along a line tangent to and uniform with the rotary movement of an evolute or base circle, the point will describe the involute curve of said evolute and the point will have moved along the tangent line, for each revolution of the evolute, a distance corresponding to the measure of the perimeter of said evolute.

In the patent referred to, the rectilinear movement is confined to the point, and the rotary movement is confined to the evolute, the axis of which rotary movement is fixed in the apparatus referred to.

In my present invention the point is fixed for a given evolute and the rectilinear and rotary movements are combined and reside wholly in the evolute, the spindle carrying the evolute serving also to carry the work to be tested.

While the device of the present invention is designed primarily for the testing of gears and gear shaped articles such as gear shaper cutters, the principle of the invention may be employed for checking the contour of cams or other articles having surfaces intended to conform to curves belonging to the general class of trochoids.

The present invention has for an important object to provide a gear testing machine which can be quickly and easily adjusted to measure the opposite faces of the teeth of a gear shaped article on the spindle of the machine.

A further object is to provide a testing machine which can be quickly and easily adjusted to check the contour of a curved surface in various planes transverse to the axis of the surface.

A further object of the invention is to provide a testing machine in which the spindle carrying the gear or other article having a curved surface to be tested is supported on rollers of a predetermined diameter to travel upon a smooth supporting track in which a weight is imposed upon the spindle which is sufficient to insure that the rollers will roll without slipping on the smooth supporting track, the spindle being so mounted with respect to the weight that it is held in place by the weight so that it can be quickly and easily removed from the machine or replaced therein.

A further object is to provide a work supporting arbor so attached to the spindle in axial alignment therewith that the arbor can be quickly and easily detached from the spindle.

A further object of the invention is to provide a weight carrying spindle actuating member which is adapted to be lowered onto or lifted off the spindle and which when lowered onto the spindle holds the same in a fixed position with respect to the actuating member and which when lifted off the spindle leaves the same free to be removed from the supporting track.

A further object is to provide the weight with anti-friction supporting rollers which engage the spindle to hold the same against lateral or axial movement with respect to the weight, said anti-friction rollers being so formed and so mounted that they offer very slight frictional resistance to the turning movement of the spindle.

A further object of the invention is to provide a weighted spindle actuating member having a rack extending parallel to the track through a guide carried by the frame of the machine in which is mounted an actuating pinion in mesh with the rack, and further to provide means for adjusting the pinion carrying guide vertically to properly position the rack with respect to the spindle supporting rollers.

A further object of the invention is to provide interchangeable spindles having permanently attached rollers which are accurately finished and highly polished by lapping on the spindle so as to insure exact concentricity of the rollers with the spindle and by simultaneous generation to bring the peripheries of the rollers into the same cylindrical surface.

A further object of the invention is to provide a gear testing machine in which the gear carrying spindle is mounted for travel in a direction at right angles to its axis on a horizontal track, and in which the tracer and error indicating mechanisms are mounted as a unit for vertical adjustment so that the tracer point may be so positioned that it will trace the curve on the rolling element to which the curved surface is intended to conform and for horizontal adjustment transversely of the line of travel of the spindle so that the tracer point may be positioned to engage the curved surface to be tested in any desired vertical plane.

Heretofore, in gear testing and gear generating machines, the correlated rotational and linear movements necessary for generating or tracing contour curves have been imparted to the gear carrying spindle and the cutting element or tracer which follows the contour of the tooth faces to be generated or measured by means of a cylinder and a member upon which the cylinder rolls without slippage.

Such cylinders can be very accurately formed and polished by lapping to a smoothness such that there will be no appreciable error due to the lack of uniformity in curvature or roughness of the cylindrical surface. Insofar as I am aware it has always been assumed that such a cylinder in rolling without slippage on a cooperating element would travel along the surface upon which it rolls, i. e. either a smooth, rigid element, such as a track having a plane supporting surface or a steel tape wound about the cylinder, a distance exactly equal to the arc of the angle through which the cylinder has turned measured on the surface of the cylinder.

As will be hereinafter more fully explained I have discovered that the actual travel of the cylinder along the member upon which it rolls without slippage is always slightly greater than the computed distance and that in order to actually obtain correct correlation between the linear and rotational movements it is necessary to make the cylinder of a diameter slightly less than that upon which the computation is based. In other words, if the cylinder corresponds to the base circle of the gear being generated or tested its actual diameter should be slightly less than that of the base circle in order to obtain a linear travel equal to that of the base circle rolling along a line.

The present invention has for an object to provide a method of determining the correction necessary for such rolling cylinders so as to eliminate the error due to the over travel of the rolling cylinder.

With the above and other objects in view the invention may be said to comprise the testing machine as illustrated in the accompanying drawings hereinafter described and particularly set forth in the appended claims together with such variations and modifications thereof as will be apparent to one skilled in the art to which the invention appertains.

Reference should be had to the accompanying drawings forming a part of this specification, in which:

Figure 1 is a front elevation of a testing machine embodying the invention;

Fig. 2 is a side elevation of the machine;

Fig. 3 is a side elevation looking toward the side opposite that shown in Fig. 2;

Fig. 4 is a front elevation showing the upper portion of the machine on an enlarged scale and showing the spindle positioned to receive a gear to be tested;

Fig. 5 is a fragmentary front elevation showing the engagement of the tracer point with the tooth face while the gear is turning in a clockwise direction and traveling toward the right as viewed in this figure;

Fig. 7 is a section taken on the line indicated at 7—7 in Fig. 1;

Fig. 8 is a section taken on the line indicated at 8—8 in Fig. 1;

Fig. 9 is a fragmentary vertical section taken axially of the spindle showing the mounting of a gear shaped article such as a gear shaper cutter on the spindle arbor and showing the tracer engaging a tooth of the cutter adjacent the front face thereof;

Fig. 10 is a fragmentary section taken through the axis of the tracer carrying lever;

Fig. 11 is a fragmentary section corresponding to Fig. 9 showing the tracer adjusted to engage with the teeth of the cutter adjacent their rear ends;

Fig. 12 is a sectional detail view showing the mounting of the tracer in the end of the tracer carrying lever;

Fig. 13 is a section taken on the line indicated at 13—13 in Fig. 2;

Fig. 14 is a fragmentary horizontal section taken on the line indicated at 14—14 in Fig. 4;

Fig. 15 is a fragmentary detail view showing one of the weight supporting rollers which engages in the groove of the spindle;

Fig. 16 is a fragmentary detail view showing one of the weight supporting rollers which engages a cylindrical bearing portion on the spindle;

Fig. 17 is a diagrammatic view showing the path of the tracer point with respect to a base circle rolling toward the left on a horizontal line;

Fig. 18 is a diagrammatic view showing the path of the tracer with respect to a base circle rolling toward the right on a horizontal line;

Figure 6:
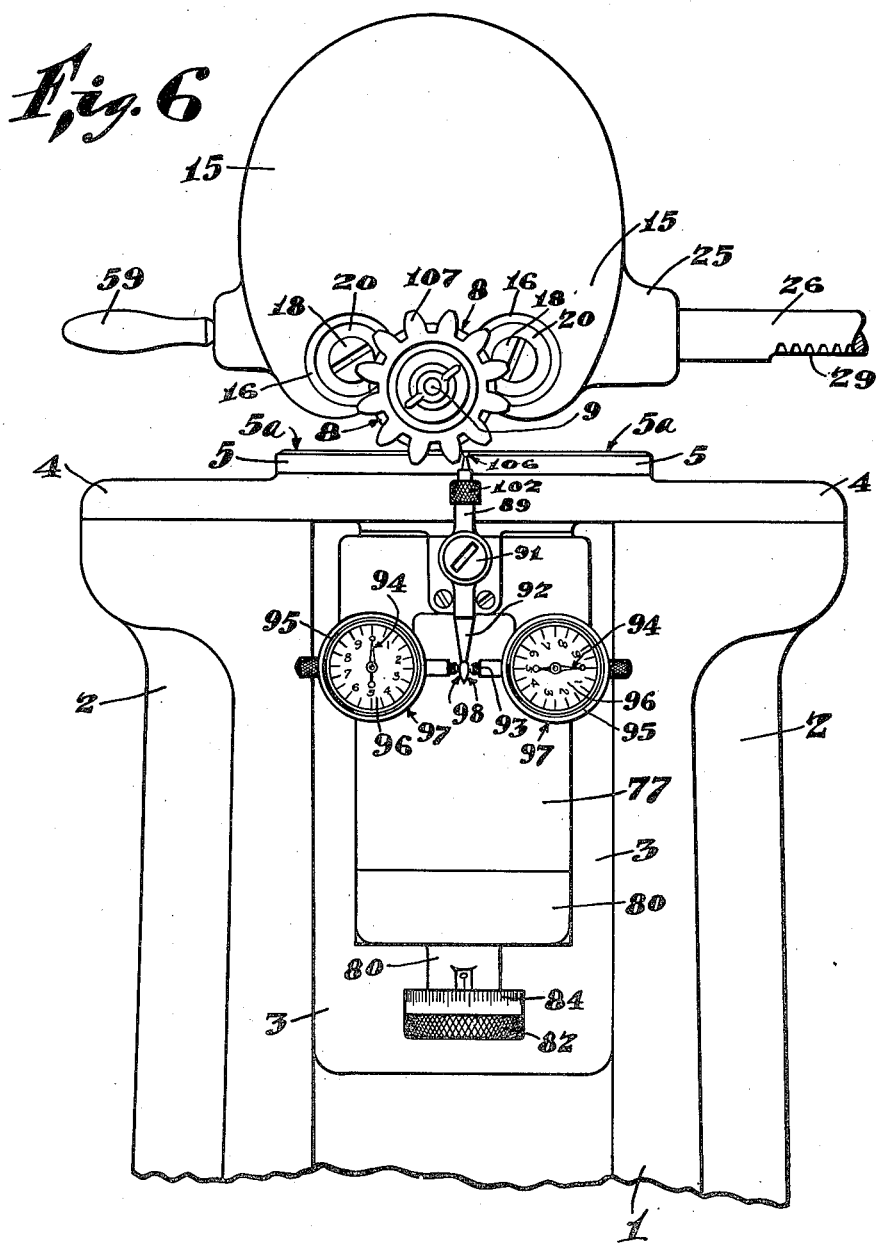
Fig. 6 is a fragmentary front elevation showing the engagement of the tracer point with an oppositely disposed tooth face as the gear is being rotated in a counterclockwise direction and is traveling toward the left as viewed in this figure.
Figure 19:
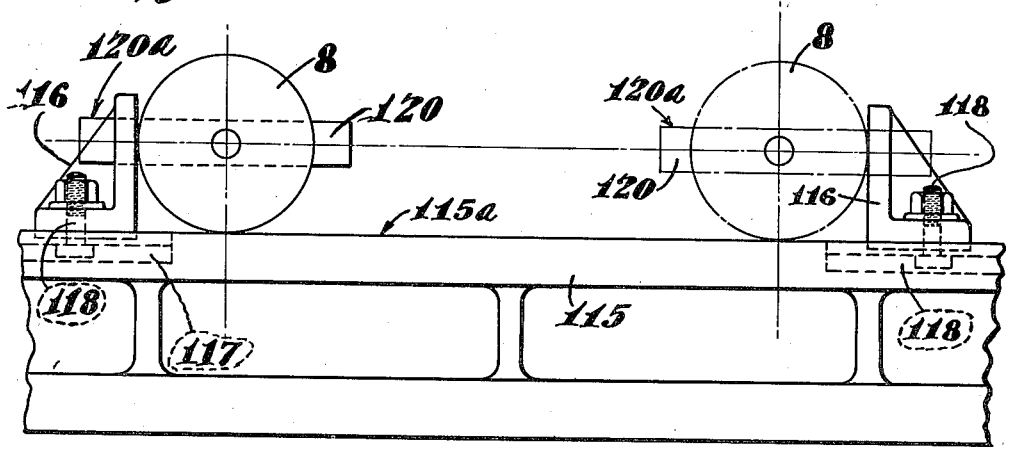
Fig. 19 is a side elevation of apparatus for accurately measuring the linear travel of a base circle roller in one complete revolution.
Figure 20:
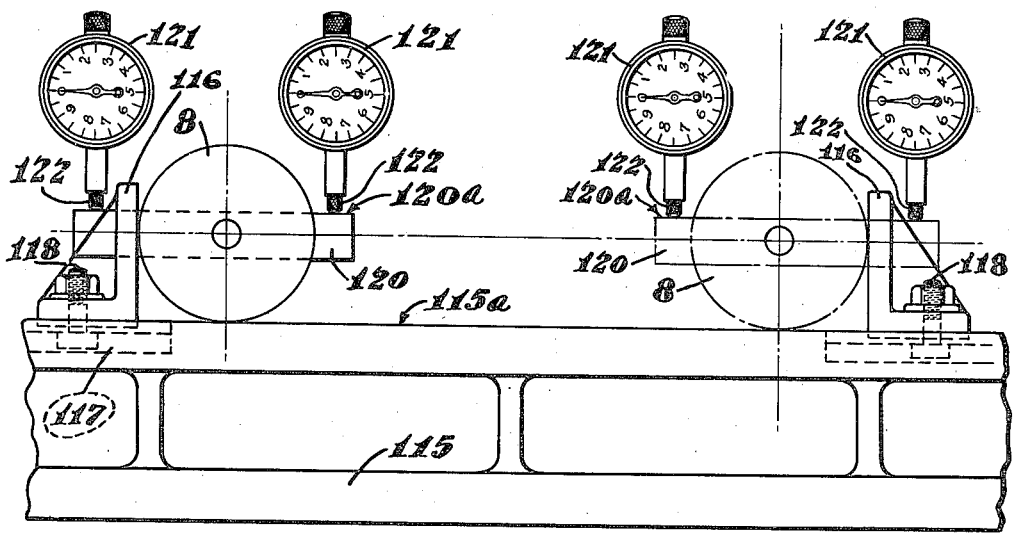
Fig. 20 is a side elevation of the apparatus shown in Fig. 19 with gauges for accurately measuring the angular position of a roller at the beginning and at the end of a revolution thereof.

In the accompanying drawings the invention is illustrated as applied to a machine for testing the accuracy of the tooth faces of an involute gear or a gear shaped article such as the gear shaper cutter to be employed for cutting involute gears.

The machine is provided with a supporting frame 1 preferably in the form of a casting, which has standards 2 at its upper end which are spaced apart to provide a recess 3 extending from the front to the rear of the frame between them. A horizontal bed plate 4 is rigidly secured to the upper ends of the standard 2 and bridges the recess 3. The bed plate 4 carries on its top surface a pair of track bars 5 which are disposed adjacent the front and rear edges of the bed plate and extend across the recess 3. Since the machine as illustrated herein tests the accuracy of surfaces intended to conform to involute or related curves which may be traced by a point in a straight line or in the plane of the line as the line is rolled upon a curve, the two parallel track bars have top surfaces lying in a plane. The surfaces of the track bars are very accurately finished and are highly polished by lapping preferably on the bed to insure that the surfaces of the two bars are exactly positioned in the same horizontal plane, the bars preferably being formed of a high grade tool steel hardened prior to the lapping operation.

A work spindle 6 is mounted to travel longitudinally of the track bars 5 and has end portions 7 formed at a slight taper upon which are fixed wide rollers 8 which are adapted to roll on the track bars 5. The work spindle 6 is the moving element which has rotational and linear movements and which carries the article having a curved profile to be tested and since, in the case of involute gears, the profiles are intended to conform to involutes of a base circle, the rollers 8 have cylindrical peripheries and may be termed base circle rollers. The rollers 8 are very accurately turned to a predetermined diameter and the cylindrical peripheries of the rollers are highly polished by lapping while fixed to the spindle to insure concentricity with the spindle and exact identity of the cylindrical peripheries. The rollers 8 are preferably formed of a hardened steel of a composition similar to the track bars 5 and in the operation of the machine these rollers roll without slippage on the smooth surfaces of the track bars 5. Irregularities on the cylindrical surfaces of the rollers and on the lapped surfaces of the track bars 5 are reduced to infinitesimal proportions by the lapping operations so that there will be no appreciable error in the ratio between the rotational and linear movements of the spindle due to roughness of the engaging surfaces.

At its forward end the spindle 6 has detachably secured thereto a gear carrying arbor 9 which has a tapering end 10 which fits in a tapering recess in the end of the spindle, the arbor being held in place by a clamping bolt 11 screwed into the tapering end 10 of the arbor extending axially through the spindle from the rear end thereof as shown in Fig. 8. Inwardly of the roller 8 at one end of the spindle 6 the spindle is provided with a V-shaped peripheral groove 12 and inwardly of and adjacent to the roller 8 at the opposite end of the spindle the spindle is provided with a raised cylindrical bearing portion 13. A suitable weight, preferably in the form of a block of metal 15 is supported upon the spindle 6 for the purpose of applying sufficient pressure to the rollers 8 to insure their travel without slippage along the track bars 5. The weight 15 is provided with a spindle receiving recess 16 on its under side and anti-friction bearing members are mounted in this recess for engagement with the spindle which support the weight on the spindle and permit the spindle to rotate in the weight with a minimum of friction.

As best shown in Fig. 14 opposed lugs 17 project into the recess 16 on opposite sides thereof adjacent the front face of the weight 15, and these lugs support short shafts 18 to which are journaled in double ball bearings 19 which are initially loaded to eliminate end play of the shafts. At their forward ends the shafts 18 have fixed thereto bearing rollers 20 which have V-shaped peripheries formed to fit in the bearing groove 12 of the spindle 6. Adjacent the rear face of the weight bearing lugs 21 project inwardly from opposite sides of the recess 16 and these lugs support short horizontal shafts 22 which are journaled in double ball bearings 23 which are initially loaded to eliminate end play of the shafts. At their rear ends the shafts 22 have fixed thereto bearing rollers 24 which have smooth cylindrical surfaces which engage the cylindrical bearing portion 13 of the spindle 6.

The shafts 18 and 22 are mounted with their axes in the same plane and the diameters of the bearing rollers 20 and 24 are such that these rollers engage the spindle 6 on opposite sides thereof above the axis of the spindle so that these rollers positively hold the spindle 6 against lateral movements with respect to the weight. The rollers 20 fitting in the V-groove 12 positively hold the spindle against axial movements relative to the weight. The peripheral surfaces of the rollers 20 and the walls of the groove 12 are accurately formed and highly polished by lapping and the same is true of the cylindrical bearing surface 13 of the spindle and the peripheral cylindrical surfaces of the rollers 24, so that the spindle is not appreciably impeded in its rotation by the friction of the weight supporting rollers.

The weight 15 is provided adjacent the bottom thereof at one side with a projecting boss 25 which receives a rack bar 26 which is held in place in the boss by a pin 27 and which is disposed at right angles to the axis of the spindle 6. The rack bar 26 extends through a tubular guide member 28 which is supported on the frame of the machine and is provided with laterally inclined teeth 29 on the underside thereof which mesh with a helical pinion 30 mounted in the guide member 28. The pinion 30 is fixed to a horizontal shaft 31 which also serves as a pivot for the guide 28 so that the weight 15 and rack bar 26 can be swung vertically away from the bed of the machine about the shaft 31 as an axis lifting the weight 15 off of the spindle 6 and leaving the spindle free to be removed from the bed. The shaft 31 is journaled in arms 32 extending upwardly from a vertically adjustable slide 33 mounted on one side of the frame of the machine, and these arms are spaced apart just a sufficient distance to receive the guide 28 between them.

As shown in Fig. 7 of the drawings, the shaft 31 is stepped on opposite sides of the gear 30, and to the rear of the gear 30 is journaled in a ball bearing 34 mounted in the guide member 28, and in a ball bearing 35 mounted in the rear arm 32. The ball bearing 35 has its outer race mounted in a sleeve 36 which has an outwardly extending flange 37 bearing against the rear face of the rear arm 32 and an internal shoulder 38 at its forward end against which said outer race is seated. The outer race of the bearing 35 is clamped against the shoulder 38 by means of a cap 39 which is secured upon the rear face of the rear arm 32 and is provided on its inner face with an annular flange 40 which fits within the sleeve 36 and engages the outer race of the bearing. The inner race of the bearing 34 is fitted upon the shaft 31 and is seated against a shoulder on the shaft. A spacer 41 is interposed between the inner race of the bearing 34 and the inner race of the bearing 35. The inner race of the bearing 35 is clamped against the spacer sleeve 41 and the inner race of the bearing 34 against the shoulder on the shaft 31 by means of a nut 42 threaded on the rear end of the shaft 31, which applies pressure to the inner races to load the bearings and positively hold the shaft 31 against end play. Forwardly of the gear 30 the shaft 31 is journaled in a ball bearing 43 mounted in the guide member 28 and in a ball bearing 44 mounted in the forward arm 32. The outer race of the bearing 44 is mounted in a sleeve 45 which fits in the bearing opening of the arm 32, said sleeve having a flange 46 engaging the front face of the arm and an internal shoulder 47 at its rear end against which the outer race of the bearing 44 is seated. The outer race of the bearing 44 is clamped in place in the sleeve 45 by means of a cap 48 secured to the front face of the front arm 32 and having an annular flange 49 which fits in the sleeve 45 and engages the outer race of the bearing 44. A hand wheel 50 is secured upon the forward end of the shaft 31 by means of a nut 51 and has a hub sleeve 52 which fits on the shaft and extends through the cap 48 and which engages with the inner race of the bearing 44. A spacer sleeve 53 is interposed between the inner race of the bearing 44 and the inner race of the bearing 43 and clamping pressure is applied to these inner races by tightening the nut 51. A disc 54 is fixed to the hub sleeve 52 and is provided with a beveled, graduated edge 55 which cooperates with a suitable zero mark on the cap 48 so that the extent of turning movements imparted to the shaft 31 and gear 30 by the hand wheel 50 may be accurately measured. By means of this graduated scale it is possible to very accurately determine the amount of linear movement imparted to the weight 15 and spindle 6 by a turning movement of the hand wheel 50, as well as the angular movement of the spindle 6 and the gear carried thereby that is being tested.

It will be apparent that the guide member 28 can rock on the bearings 34 and 43 to permit the rack bar 26 and weight 15 to swing upwardly about the shaft 31 as a pivot and that the shaft 31 in the normal operation of the machine rotates in the bearings 34, 35, 43 and 44.

Means is provided for clamping the rack bar 26 against endwise movements in the guide member 28, since this is desirable to prevent actuation of the weight when the spindle is removed and while the weight is being lifted to free a spindle. To this end a pair of clamping blocks 56 are mounted in the guide member 28 above the rack 26 for engagement with the bar 26 on opposite sides of the center plane thereof and these wedge blocks are simultaneously actuated in opposite directions by means of a screw 57 which has oppositely threaded portions engaging the block 56. The screw 57 being provided with a handle 58 by means of which it may be turned to move the block 56 into clamping engagement with the rack bar or to free the rack bar.

To facilitate the lifting of the weight 15 the weight is preferably provided with a handle 59 projecting from the side opposite that to which the rack bar 26 is attached, so that the operator can readily lift the weight to release a spindle or to insert a spindle.

As best shown in Fig. 13 the vertically adjustable slide 33 which supports the shaft 31 and guide member 28 is mounted on a guide bracket 60 attached to one of the standards 2 beyond the end of the bed plate 4, and the slide 33 may be adjusted vertically by means of a vertically disposed screw 61 which is journaled in a bearing bracket 62 secured to the lower end of the slide and held against endwise movement in the bearing bracket by means of a flange 63 on the screw which engages the top face of the bracket and a hand wheel 64 which is held in place on the lower end of the screw by means of a nut 65 and which bears against the bottom face of the bearing bracket 62. The screw 61 extends vertically into the guide bracket 60 and has threaded engagement with a nut 60a secured in the lower end of the bracket. The hand wheel 64 has a cylindrical periphery, the lower portion of which is knurled to provide a good hand grip and the upper portion of which is smooth and provided with a graduated scale 66 which cooperates with a suitable zero mark on the bearing bracket 62, providing means to accurately indicate the extent of angular movements of the screw 61 so that the slide 33 and bearing sleeve 28 may be very accurately adjusted.

As shown in Figs. 8 and 13, the bed plate 4 is provided with a transverse way 67 on the under side thereof which is centrally disposed with respect to the recess 3 of the frame. A slide 68 is mounted on the way 67 for adjustment forwardly and rearwardly beneath the bed and this slide 68 may be adjusted forwardly or rearwardly by means of a horizontal screw 69 which is threaded in a nut 70 secured in the rear end of the slide 68 and which is journaled in a bearing lug 71 depending from the rear edge of the bed plate 4. The screw 69 is held against endwise movements with respect to the lug 71 by means of a flange 72 on the screw which bears against the inner face of the lug 71 and a hand wheel 73 which bears against the outer face of the lug 71, the hand wheel being clamped in place by means of a nut 74 on the rear end of the screw 69.

As best shown in Fig. 7, the hand wheel 73 has a cylindrical periphery, the outer end portion of which is knurled to provide a good hand grip and the inner portion of which is smooth and provided with a graduated scale 75 which cooperates with a suitable zero mark on the bearing lug 71 so that the amount of angular movement imparted to the hand wheel 73 can be accurately determined and fine adjustments of the slide 68 may be made.

As best shown on Fig. 8, a vertically adjustable slide 77 is mounted on the forward end 76 of the slide 68 and the slide 77 may be adjusted vertically by means of a vertically disposed screw 78 which is threaded in a nut 79 secured in the slide end 76 and journaled in a bearing bracket 80 attached to the lower end of the slide 77. The screw 78 is held against endwise movement in the bearing bracket 80 by means of a flange 81 which engages the top face of the bearing and a hand wheel 82 which bears against the bottom face of the bearing, the hand wheel 82 being held in place by a nut 83 on the lower end of the screw. As shown in Fig. 7 the hand wheel 82 has a cylindrical periphery the lower end portion of which is knurled to provide a good hand grip and the upper portion of which is smooth and provided with a graduated scale 84 which cooperates with a suitable zero mark on the bracket 80 to indicate the extent of angular movements of the screw 78 so that the fine adjustments of the slide 77 may be very accurately made.

As shown in Fig. 10 of the drawings, a stub shaft 85 is rigidly secured to the upper end of the slide 77 and projects from the front face thereof. The stub shaft 85 has a conical portion 87 that fits in a conical recess in the front face of the slide 77, a reduced threaded portion 86 beyond the conical portion 87 which screws into a threaded opening in the slide and a hex portion 8 by means of which the shaft may be screwed tightly in place on the slide by means of a wrench. Outwardly of the hex portion 88 the shaft 85 is cylindrical and provides a pivot for tracer carrying lever 89 which is supported on double ball bearings 90 which are clamped in place and initially loaded by means of a cap screw 91 at the end of the shaft 85, the lever 89 being thus positively held against movement axially of the supporting shaft or pivot 85.

As shown in Figs. 4, 5 and 6 the lever 89 has a downwardly extending arm 92 which is positioned between actuating plungers 93 which actuate the pointers 94 of dial gauges 95 which have graduated dials 96 and which are adapted to register minute movements of the plungers. The dials 96 are preferably rotatably mounted for angular adjustment to any position with respect to the pointers, so that in any position of the lever 92 the zero points on the dials 96 may be brought into registry with the pointers 94, gauge bezels which carry the dials being provided with knurled peripheries 97 to provide a good hand grip and being mounted on the body portions of the gauges so that they may be readily turned to adjust the dials. The lower end of the arm 92 is provided with curved plunger engaging faces 98 which are formed on oppositely extending involutes of a circle having its center at the pivotal axis of the lever and passing through the points on the plungers 93 which engage with the lever when the lever is in vertical position, so that the linear movement imparted to either plunger is in exact proportion to the angular movement of the lever.

As best shown in Figs. 10 and 12, the lever 89 is provided at its upper end with a socket 99 which receives the lower end of a tracer 100 which is provided with an integral flange 101 which rests against the end face of the lever and which is clamped by a sleeve 102 threaded on the upper end of the lever and having an inwardly extending flange 103 which engages the upper side of the flange 101. The exterior surface of the sleeve 102 is preferably knurled so that the tracer may be clamped or freed by hand. The socket 99 and the cylindrical lower end of the tracer 100 which engages in it, are formed to have a very close fit so that the tracer is rigidly held in place on the lever. In order to prevent air from being trapped in the socket 99 a vent opening 104 extends from the side of the lever to the bottom of the socket 99. The vent 104 prevents the creation of air pressure in the socket 99 upon insertion of a tracer so that the tracer 100 can be easily pushed into the socket and the flange 101 brought into contact with the end of the lever, thereby avoiding an air cushion which would tend to prevent complete entry of the tracer into the socket and which might cause a loose connection between the lever and tracer. The tracer 100 has a tapering upper end 105 which terminates in a reversely tapered conical engaging point 106 which is adapted to provide point contact with the surface to be tested.

In Figs. 9 and 11 of the drawings, a gear shaper cutter 107 is shown mounted on the arbor 9 in position to be engaged by the tracer 100. In order to facilitate the interchanging of gears or gear shaped articles on the arbor 9 the gear or gear shaper cutter is preferably clamped upon a sleeve 108 which has an internal diameter to fit closely upon the arbor 9. This sleeve is provided at its inner end with a flange 109 and the gear or gear shaper cutter is clamped against the flange 109 by means of a nut 110 and a washer 111 on the forward end of the sleeve. The flange 109 of the sleeve bears against a flange 112 on the arbor 9 and the sleeve 108 may be clamped against the flange 112 by means of a wing nut 113 on the outer end of the arbor 9.

Table 114 shown in Figs. 1, 2 and 3 is the base of an auxiliary checking device which forms no part of the present invention. In the commercial machine of the present invention this auxiliary checking device is shown secured to the frame 1.

In the operation of the machine a gear or gear shaper cutter may be placed on the arbor 9 when the spindle is positioned as shown in Fig. 4 so that the teeth of the gear shaped article may straddle the tracer 100 and, before the sleeve 108 has been clamped to the arbor 9, the gear shaped article and its supporting sleeve may be turned by hand on the arbor 9 until the face of one of the teeth of the gear shaped article is brought to a position in which it touches the tracer point 106. The wing nut 113 is then tightened to clamp the sleeve 108 and the gauge dials 96 are then adjusted to bring the zero marks thereon into registry with the pointers 94. The hand wheel 50 is then turned to move the weight 15 and spindle 6 along the supporting bed and, since the supporting rollers 8 roll without slippage on the track bars 5, the tracer point 106, if disposed in the plane of the track bar surfaces, will follow an involute path with respect to the rolling base circle rollers 8, as illustrated in Figs. 17 and 18. In Fig. 17 the base circle $b$ is rolling toward the left and the tracer point 106 follows the curve $a$ which is an involute of the base circle $b$. In Fig. 18 the base circle $b$ is rolling toward the right and the tracer point 106 traces the oppositely extending involute curve $d$.

The rollers 8 are of a diameter corresponding to the diameter of the base circle of the gear to be tested except for a small correction which will be hereinafter explained, so that the path of travel of the tracer point 106 with respect to the rotating and laterally moving gear or gear shaper cutter is along an involute curve which is the correct involute curve for the tooth faces of that gear. Any deviation from the theoretically correct curve on a tooth face will cause deflection of the pressure point 106 and angular movement of the lever 89, causing one of the plungers 93 to be actuated moving its pointer 94 and indicating on the dial 96 the magnitude of the error in tooth contour, either plus or minus as the case may be. The dial gauges 97 are capable of registering the minutest error. The commercial gauges shown register to 5/100,000" and a measure of one-half of this magnitude may be easily detected by the operator.

It is important in this machine that the tracer point 106 be positioned with precision tangent to the base circle or evolute $b$, as shown in Figs. 17 and 18. For this purpose the slide 77 has preferably been provided, which will enable the operator to move the tracer needle point to the position of tangency with respect to the base circle $b$ by rotating the hand wheel 82, which will move the slide 77 upwards or downwards, along a vertical line, toward or from the line of tangency 5$a$, and further provides, in addition to the adjustment for position as referred to, a means to compensate for any wear and readjust the surface 106$a$ to the desired position of tangency with respect to the base circle or evolute $b$.

In the actual machine, see Fig. 4, the track bars 5 are provided with a very accurately lapped upper surface, which corresponds to the line of tangency 5$a$ previously referred to, and to enable the operator to adjust the slide 77 so that the surface 106$a$ will lie truly in the plane 5$a$ of the track bar 5, there is preferably provided an evolute disk 123, commercially known in the shop as a needle point setting disk. This disk is provided with a hole adapting it to fit snugly, without shake, on the arbor spindle 9. The outside diameter of this needle point setting disk 123 is made with the greatest precision to the theoretical diameter of the base circle. It is only necessary, therefore, for the operator to grasp the hand wheel 50 by hand and rock it to and fro, which will cause spindle 6 to move to and fro on the track bar 5. During this movement the operator may move the slide 77 upwards or downwards, as he finds necessary, until the needle point setting disk 123 just contacts with the surface 106a of the needle point tracer 100. The needle point setting disk may then be removed from the spindle and the cutter or gear 107 placed thereon and positioned so that one side of the tooth engages the tracer point 106, the position of contact selected by the operator being such as to cause the dial indicator needle pointer 94 to move through an arc of 90° from its non-contacting position.

This adjustment of the tracer point 106 with respect to the side tooth of a gear or cutter enables the operator to not only detect the magnitude of the error, but also whether it is plus or minus from the true theoretical curve.

The adjustment referred to is shown in Figs. 5 and 6. In Fig. 5 the curve on the tooth to the left of the observer is being tested. The operator has positioned the pointer 94 of the dial gauge 95 to the right of the observer at 90° from the position it assumes when not in use. The gauge bezel, by means of a knurled periphery 97, is then rotated by the operator so that zero on the dial indicator is opposite the pointer. The gear or cutter being tested may then be rolled on the track bar 5 and the inaccuracies or accuracy will be indicated by the pointer 94 of the dial gauge 95 as it is rolled from right to left and vice versa.

In like manner the opposite side curve of the tooth shown in Fig. 6 may be tested and with respect to this test it is to be noted that the reading is now taken from the dial gauge 95 located to the left of the observer. By reversing the cutter or gear, a check on the readings may be obtained since the reading taken on the dial gauge shown in Fig. 5 to the right of the observer may be taken on the dial gauge shown to the left of the observer if the cutter or gear is turned about on the spindle 9, as shown in Fig. 6.

As in my prior Patent No. 1,670,906, the flank fullness of gear shaper cutters may be accurately checked on the machine of the present invention.

The tracer and error registering mechanism is mounted as a unit for adjustment transversely with respect to the supporting bed, so that the tracer point 106 can be positioned to engage a gear tooth or other surface to be tested at any point along the length thereof. For instance, in testing a gear shaper cutter the slide 68 may be adjusted to position the tracer 100 closely adjacent the front face of the cutter as shown in Fig. 9 and the tracer can be adjusted to various positions rearwardly until the tracer engages the rear portion of the tooth as shown in Fig. 11, so that the contour may be checked throughout the length of each tooth.

A gear or gear shaper cutter can be quickly and easily indexed by hand by loosening the wing nut 113 and turning the gear supporting sleeve 108 on the arbor 9 after the gear has been moved to a position laterally clear of the tracer point 106. It will be observed that the track bars are fixed and that the tracer point remains in a fixed position unless shifted by an inaccurate portion of the curved surface being tested and that the path of the tracer point in a plane fixed to the rolling spindle and turning therewith is the same as the curve which would be traced in a fixed plane if the spindle were stationary and the track and tracer were rolled as a unit about the curved surface engaging the track. In the particular apparatus herein illustrated, the curve upon which the spindle is supported is a cylinder and the track is a plane surface in order to cause the tracer point to follow an involute curve. However, the track may be a curved surface and the spindle supporting curve may be circular or non-circular. Furthermore, the tracer point may be adjusted to positions above or below the track surface to bring the generating or tracing point inside or outside the rolling curve. The tracer point may thus be caused to follow any of the curves of the class known as trochoidal curves including the cycloids, epicycloids, hypocycloids and involutes of circles and other curves.

In order to positively determine the exact relation of rotary to linear travel of the accurately formed lapped base circle rollers, apparatus was built for accurately measuring the extent of linear travel of these rollers in one complete revolution and the larger number of tests has proven that the actual linear travel of the roller is always slightly in excess of the actual circumference of the roller. For a roller of given diameter the excess travel was found to be a substantially constant quantity. For instance, in rollers ranging from 3 to 4 inches in diameter it was found that the actual linear travel exceeded the circumference of the roller by an amount approximately equal to .0001 Pi times the diameter of the roller.

For measuring the extent of linear travel, a supporting track 115 was provided having an upper surface 115a perfectly flat and highly polished by lapping. Stop members 116 were provided at opposite ends of this track, the stop members 116 being mounted for adjustment in ways 117 and being firmly held in adjusted position by means of clamping bolts 118. The stop members 116 were provided with vertical stop faces 119 of a height greater than the radius of the rollers to be tested. In order to accurately limit the turning movement of the rollers to one complete revolution each of the rollers was provided with a bar 120 rigidly attached thereto, this bar having an accurately lapped upper face 120a adapted to cooperate with dial gauges 121 provided with vertically disposed plungers 122 adapted to be brought into contact with the upper face of the bar.

In making the test, the face 120a of the bar 120 is brought to exactly horizontal position, parallel to plane surface 115a, and one of the stop members 116 is adjusted into contact with the periphery of the roller. The roller is then rolled along the surface 115a until the face 120a of the bar 120 is again brought to horizontal position with the same face uppermost, the exact horizontal position being determined by a second pair of dial gauges 121. A second stop member 116 is then adjusted into contact with the periphery of the roller and the distance between the faces 119 of the stop members is then accurately measured.

In this manner I have discovered that in order to obtain exactly the correct correlation between the rotary and linear movements of the gear carrying spindle, it is necessary that the base circle roller be of a diameter slightly less than the diameter of the base circle of the gear. For instance, in gears having a base circle ranging from three to four inches in diameter, supporting rollers 8 should be less in diameter than the diameter of the base circle of the gear by an amount substantially equal to .0001 times the base circle diameter in order to accurately obtain a linear movement corresponding to the rolling movement of the base circle along a straight line. This eliminates an error which has heretofore been inherent in gear testing and gear generating machines and makes possible more accurate testing and more accurate generation of gears.

The slide 33 is adjustable vertically as hereinbefore described, which provides a means for adjusting the rack bar 26 to maintain it in substantially a horizontal position as shown in Fig. 1, since it will be obvious that as the rollers 8 are substantially of a diameter corresponding to the base circle of gear or cutter to be tested, the spindle arbor 9 will take a vertical position above the surface 5a of the track bars 5 and the magnitude of the measure of the axis of the spindle 6 above the surface 5a of the track bar 5 will be in accordance with the radius of curvature of the rollers 8. Hence, to maintain the rack bar 26 in a substantially horizontal position the slide 33 has been provided permitting this adjustment. The horizontal position of the rack bar 26 is obtained in the shop by means of a spirit level or more often by visual inspection, either of which appears to be entirely satisfactory.

The present invention provides the means, as hereinbefore described, for checking opposite sides of the teeth of gears or gear shaped cutters at any position selected along the length of the tooth. This is of great advantage since in the actual use of the machine it is not necessary to reverse the cutter or gear being tested which would involve its removal from the spindle arbor of the machine, reversing end for end and reassembling on the spindle arbor 9. There is also the added advantage, through the instrumentality of the means herein described, of having the same face of the cutter presented to the observer during the entire check of opposite sides of the teeth, throughout the entire length of the teeth axially of the cutter or gear, at various selected positions as may be determined by the operator. Positions selected axially of the tooth may be quickly obtained by the operator by means of the slide 68 hereinbefore described.

The slide 77 provides a means for adjusting the tracer needle point 106 along a vertical line, upwards or downwards, as hereinbefore described. The adjustable slides, namely 33, 68 and 77, provide very convenient means for adjustment of the cooperating related parts herein referred to and the knurled hand wheels 64, 73 and 82 are easy of access to the operator and enable him to easily and quickly make the necessary adjustments as required to meet the various conditions of practice.

Another feature of importance in the present invention resides in making the opposed shafts 18, which carry the V-rollers 20, entirely independent of each other so that the rotary movement of one roller 20 will not influence the rotary movement of its opposed roller 20. For the same reason, opposed shafts 22 are entirely independent of each other as is also the rotary movement of one roller 24 with respect to the rotary movement of its opposed roller 24.

Similarly and for the same reason, roller shafts 18 and 22 are entirely independent of each other. Thus, any variation in the diameter of the roller 24, if the variation does not consist in reducing one diameter as against the other to the point of absurdity, will have no marked influence on the proper functioning of the rollers 24 and the cylindrical bearing surface 13 of the spindle 6.

Similarly, the V-shaped rollers 20 may vary in diameter without influencing the accuracy of their function with respect to the V-shaped groove 12 of the spindle 6 if they in turn do not vary to the point of absurdity.

The bearing surface 13 is a pitch circle with respect to the rollers 24. Similarly, the middle portion of the V form on the rollers 20 should correspond substantially to the diameter of the roller 24, although as stated, a marked variation in this will have no influence on the accuracy of results since the rollers are independently mounted with respect to each other, eliminating friction and causing them to truly roll as against one rolling and the other sliding, or vice versa, which would result if any pair of rolls 20 and 24 were mounted on the same shaft and differed in diameter from that diameter selected. The independence of these rollers with respect to each other precludes any possibility of one roller sliding and the other one slipping, which would cause errors of reading and in addition, a very objectionable frictional torque which would result in vibration. The possibility of these objectionable things is entirely eliminated in the construction as illustrated and described in the present invention.

Although a preferred embodiment of my invention has been illustrated and described herein, it should be understood that the invention is susceptible of various modifications and adaptations within the scope of the appended claims.

I claim:

1. In a machine of the character described, a frame provided with a supporting track having a smooth supporting surface, a work spindle, supporting members fixed to the spindle and having smooth curved surfaces adapted to roll on said track, means for securing an article to be tested to said spindle, a weight bearing upon said spindle, cooperating means between said weight and frame whereby the weight is liftable from said spindle, and a tracer carried by said frame for engagement with the work.

2. In a machine of the character described, a frame provided with a supporting track having a smooth supporting surface, a work spindle, supporting members on the spindle and having smooth curved surfaces adapted to roll on said track, means for securing an article to be tested to said spindle, a weight having a recess on the under side thereof to receive the spindle, rotatable bearing members mounted in said recess for engagement with the spindle, means for holding said weight against turning movements, means for moving the weight longitudinally of the track to roll the spindle, and a tracer carried by said frame for engagement with the work.

3. In a machine of the character described, a frame provided with a supporting track having a smooth supporting surface, a work spindle, supporting members on the spindle and having smooth curved surfaces adapted to roll on said track, a weight having a recess on its under side to receive the spindle, anti-friction bearing members in said recess for engagement with the spindle, means carried by the frame for holding the weight in a substantially fixed position with respect to the axis of the spindle and for moving the weight longitudinally of said track to cause said supporting members to roll on the track, thereby imparting to the spindle correlated rotational and linear movements.

4. In a machine of the character described, a frame provided with a supporting track having a smooth supporting surface, a work spindle, supporting members on the spindle and having smooth curved surfaces adapted to roll on said track, a weight having a recess on its under side to receive said spindle, pairs of spindle engaging rollers in said recess, the rollers of each pair being alined transversely of the recess and having their peripheries spaced apart a distance less than the diameter of said spindle, a bar fixed to said weight and extending at right angles to the spindle recess, and a guide for said bar carried by the frame.

5. In a machine of the character described, a frame provided with a supporting track having a smooth supporting surface, a work spindle, supporting members on the spindle and having smooth curved surfaces adapted to roll on said track, a weight having a recess on its under side to receive said spindle, pairs of spindle engaging rollers in said recess, the rollers of each pair being alined transversely of the recess and having their peripheries spaced apart a distance less than the diameter of said spindle, a bar fixed to said weight and extending at right angles to the spindle recess, and a guide for said bar carried by the frame, said guide being pivoted to swing about an axis transverse to said bar whereby said weight may be lifted clear of the spindle.

6. In a machine of the character described, a frame provided with a supporting track having a smooth horizontal supporting surface, a work spindle having a supporting roller fixed thereto which is provided with a smooth cylindrical periphery adapted to roll on said track, a weight having a spindle receiving recess on its under side, anti-friction bearing members in said recess for engagement with the spindle, and means carried by the frame for moving the weight longitudinally of the track and for holding the weight in a substantially fixed position with respect to the axis of the spindle.

7. In a machine of the character described, a frame provided with a supporting track comprising spaced track bars having smooth top surfaces, a work spindle having supporting rollers spaced apart a distance corresponding to the spacing of the track bars and having smooth peripheral surfaces adapted to roll on the track bars and lying in the same cylindrical surface of revolution, a work carrying arbor detachably secured to one end of the spindle in axial alinement therewith, a weight having a spindle engaging portion of a width to enter between said rollers and having a spindle receiving recess, anti-friction bearing members in said recess for engagement with the spindle, and means carried by the frame for moving said weight longitudinally of the track and for holding the weight in a substantially fixed position with respect to the axis of the spindle.

8. In a machine of the character described, a frame provided with a supporting track comprising spaced track bars having smooth top surfaces, a work spindle having supporting rollers spaced apart a distance corresponding to the spacing of the track bars and having smooth peripheral surfaces adapted to roll on the track bars and lying in the same cylindrical surface of revolution, a work carrying arbor detachably secured to one end of the spindle in axial alinement therewith, a weight having a spindle engaging portion of a width to enter between said rollers and having a spindle receiving recess, anti-friction bearing members in said recess for engagement with the spindle, a rack bar fixed to the weight and disposed at right angles to the spindle, a guide for said rack bar carried by the frame, a pinion carried by said guide for actuating the rack bar, and means for actuating said pinion.

9. In a machine of the character described, a frame provided with a supporting track comprising spaced track bars having smooth top surfaces, a work spindle having supporting rollers spaced apart a distance corresponding to the spacing of the track bars and having smooth peripheral surfaces adapted to roll on the track bars and lying in the same cylindrical surface of revolution, a work carrying arbor detachably secured to one end of the spindle in axial alinement therewith, a weight having a spindle engaging portion of a width to enter between said rollers and having a spindle receiving recess, anti-friction bearing members in said recess for engagement with the spindle, a rack bar fixed to the weight and disposed at right angles to the spindle, a guide for said rack bar carried by the frame, a shaft carried by the frame and parallel with said spindle on which said guide is pivoted, and a pinion fixed to said shaft and meshing with the rack bar.

10. In a machine for testing the accuracy of curved surfaces, a supporting frame, a work spindle supported on the frame, means for imparting to said spindle in a direction transverse to its axis and for simultaneously imparting a correlated rotational movement thereto, a slide mounted on the frame for adjustment in a direction parallel with the axis of the work spindle, an error registering unit mounted on said slide for adjustment in a direction transverse to the axis of the work spindle, said unit including a lever pivoted to swing about an axis parallel with the work spindle, a tracer carried by the lever for engagement with a curved surface on the work carried by the spindle, a pair of movement indicating devices mounted on opposite sides of said lever and having actuating plungers engaging opposite sides of the lever.

11. In a machine for testing the accuracy of curved surfaces, a frame having a horizontal bed and a recess beneath the bed, a track on said bed extending transversely over said recess, a work spindle mounted to roll on said track and having means for detachably securing an article having a curved surface to be tested to an end of the spindle, a slide mounted in said recess for horizontal adjustment transversely of the track, and an error indicating unit mounted for vertical adjustment on said slide and including a movable tracer and a movement indicating mechanism operatively connected to the tracer.

12. In a machine of the character described, a frame having a horizontal supporting track, a spindle mounted to roll on said track, said spindle having an axially alined arbor at one end, a work carrying sleeve rotatably fitting on said arbor, means for clamping the work to said sleeve, and manually operable means for clamping said sleeve to said arbor in any position of angular adjustment of the sleeve on the arbor.

13. In a machine of the character described, a frame having a horizontal supporting track, a work spindle mounted to roll on said track, a weight having a spindle receiving recess on the underside thereof, anti-friction bearing members in said recess engageable with the spindle, a rack bar rigidly secured to the weight and extending horizontally at right angles to the spindle, a guide for said rack bar, a vertically adjustable slide on said frame supporting said guide, and means for actuating said rack bar to move the weight and spindle along the track including a pinion mounted in the guide and meshing with the rack bar.

14. In a machine of the character described, a frame having a supporting track having a supporting surface lying in a horizontal plane, a spindle having a cylindrical supporting portion resting on said track to roll thereon whereby the angular movement of the spindle is in a predetermined ratio to the linear movement thereof, said cylindrical portion having a diameter less than that theoretically required to obtain said predetermined ratio between the linear and annular movements of the spindle, but such that the linear travel of the portion during a given arc of revolution equals the theoretical linear travel of the base circle of the work carried by said spindle rolling along a line during a corresponding arc of revolution.

15. In a machine of the character described, a frame having a horizontal supporting track, a work spindle mounted to roll on said track, a guide member on the frame pivoted to swing about an axis parallel with the spindle, and a weight adapted to rest on said spindle and having anti-friction bearing members engageable with the spindle, said weight having an extension slidable in said guide.

16. In a machine of the character described, a frame having a horizontal supporting track, a work spindle mounted to roll on said track, a guide member on the frame pivoted to swing about an axis parallel with the spindle, a weight having an extension slidable in said guide, said weight having a recess on its under side to receive said spindle, and bearing rollers carried by the weight in said recess and engageable with the spindle, certain of said rollers engaging a groove in said spindle to hold the spindle against axial movements.

17. In a machine of the character described, a frame provided with a track having a smooth supporting surface, a work spindle having supporting members associated therewith and arranged to roll on said track, a weight bearing upon said spindle, means movably connecting said weight with said frame whereby it may be lifted from said spindle, and a tracer carried by said frame for engagement with the work mounted upon said spindle.

18. In a machine of the character described, a frame provided with a track having a smooth supporting surface, a work spindle having supporting members associated therewith and arranged to roll on said track, a weight bearing upon said spindle, means pivotally connecting said weight with said frame whereby it may be swung and lifted from said spindle, and a tracer carried by said frame for engagement with the work carried by said spindle.

19. In a machine of the character described, a frame having a smooth supporting surface, a work spindle, means for mounting said spindle to roll on said supporting surface, a weight bearing upon said spindle, cooperating means between said weight and frame whereby the weight is liftable from said spindle, and a tracer carried by said frame for engaging with the work mounted on said spindle.

20. In a machine of the character described, a frame having a smooth supporting surface, a work spindle mounted to roll on said supporting surface, a weight bearing upon said spindle, means for swinging said weight about a normally fixed axis to remove the same from said spindle, and a tracer carried by said frame for engaging with the work carried by said spindle.

21. In a machine of the character described, a frame having a smooth supporting surface, a work spindle mounted to roll on said supporting surface, a weight bearing upon said spindle, means for swinging said weight about a normally fixed axis, means for moving said weight linearly and in a direction transverse to the axis of said spindle, and a tracer carried by said frame for engaging with the work carried by said spindle.

22. In a machine of the character described, a frame having a smooth supporting surface, a work spindle mounted to roll on said supporting surface, a weight bearing upon said spindle, means for moving said weight about a normally fixed axis, means for moving said weight linearly in a direction transverse to the axis of said spindle, means for adjusting said normally fixed axis in a direction substantially normal to said supporting surface, and a tracer carried by said frame for engaging the work carried by said spindle.

23. In a machine of the character described, a frame having a smooth supporting surface, a work spindle mounted to roll on said supporting surface, a weight bearing upon said spindle, means for swinging said weight about a normally fixed axis, means for adjusting said normally fixed axis in a direction substantially normal to said supporting surface, a tracer carried by said frame for engagement with the work carried by said spindle, means for adjustably moving said tracer in a direction parallel to the axis of said spindle, and means for adjustably moving said tracer in a direction transverse to said spindle.

24. In a machine of the character described, a frame having a smooth supporting surface, a work spindle mounted to roll on said supporting surface, a weight having anti-friction members bearing upon said spindle, means whereby said weight may be moved in a predetermined path to lift the same and said anti-friction members out of bearing engagement with said spindle, and a tracer carried by said frame for engagement with the work carried by said spindle.

25. In a machine of the character described, a frame having a smooth supporting surface, a work spindle mounted to roll on said supporting surface, a weight having anti-friction members engaging said spindle, said spindle and certain anti-friction members being formed with cooperating interfitting portions for holding the spindle against axial movement, means for holding said weight against turning movement, and a tracer carried by said frame for engagement with the work carried by said spindle.

26. In a machine of the character described, a frame having a smooth supporting surface, a work spindle mounted to roll on said supporting surface, a weight having anti-friction members, said spindle being provided with portions adapted to be engaged by said anti-friction members, certain of said portions and certain of said anti-friction members being formed to cooperatively interfit with one another to hold said spindle against axial displacement, means for holding said weight against turning movement and a tracer carried by said frame for engagement with the work carried by said spindle.

OLIVER G. SIMMONS.